US012639153B2

(12) United States Patent
Poosapalli et al.

(10) Patent No.: US 12,639,153 B2
(45) Date of Patent: May 26, 2026

(54) REMEDIATION INTERFACE FOR SELF HEAL FIELD FAULTS

(71) Applicant: Dell Products L.P., Round Rock, TX (US)

(72) Inventors: Karunakar Poosapalli, Medak (IN); Shekar Babu Suryanarayana, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/976,602

(22) Filed: Oct. 28, 2022

(65) Prior Publication Data

US 2024/0143435 A1 May 2, 2024

(51) Int. Cl.
G06F 11/00 (2006.01)
G06F 11/07 (2006.01)

(52) U.S. Cl.
CPC ...... G06F 11/0793 (2013.01); G06F 11/0721 (2013.01)

(58) Field of Classification Search
CPC .......................... G06F 11/0793; G06F 11/0721
USPC ....................................................... 714/1–57
See application file for complete search history.

(56) References Cited

U.S. PATENT DOCUMENTS

| | | | | | |
|---|---|---|---|---|---|
| 6,567,826 | B1 * | 5/2003 | Fischer | ............... | G06F 11/0706 |
| 7,464,104 | B2 * | 12/2008 | Jones | ................. | G06F 11/1402 |
| | | | | | 707/999.102 |

| | | | | | |
|---|---|---|---|---|---|
| 2002/0144245 | A1 * | 10/2002 | Lueh | .................. | G06F 11/3644 |
| | | | | | 714/E11.209 |
| 2003/0126511 | A1 * | 7/2003 | Yang | ..................... | G06F 9/4401 |
| | | | | | 714/39 |
| 2003/0229826 | A1 * | 12/2003 | Lee | ..................... | G06F 11/2092 |
| | | | | | 714/42 |
| 2005/0177759 | A1 * | 8/2005 | Cabrera | .............. | G06F 11/1441 |
| | | | | | 714/2 |
| 2007/0174704 | A1 * | 7/2007 | Shih | ..................... | G06F 11/3664 |
| | | | | | 714/36 |
| 2011/0087920 | A1 * | 4/2011 | Hendricks | ........... | G06F 11/1415 |
| | | | | | 714/21 |
| 2012/0137180 | A1 * | 5/2012 | Shao | ................... | G06F 11/0778 |
| | | | | | 714/E11.029 |
| 2013/0073715 | A1 * | 3/2013 | Whitlock | ............ | H04L 41/0681 |
| | | | | | 709/224 |
| 2013/0305083 | A1 * | 11/2013 | Machida | .............. | G06F 11/008 |
| | | | | | 714/4.1 |

(Continued)

*Primary Examiner* — Sarai E Butler
(74) *Attorney, Agent, or Firm* — Jackson Walker L.L.P.

(57) ABSTRACT

A method for remediating an information handling system, wherein the method includes running a fault monitoring module during a runtime of the information handling system to detect field fault conditions, collect field fault data associated with field fault conditions, upload the field fault data to a remediation engine, and receive remediation objects from the remediation engine. The method further includes detecting a fault condition, receiving a remediation object corresponding to the fault condition wherein the remediating object includes one or more remediation templates, and providing notice of the fault condition to a remediation interface. The remediation interface is configured to boot the information handling system into a remediation mode and load and execute the remediation templates to resolve the field faults.

10 Claims, 11 Drawing Sheets

(56)          References Cited

U.S. PATENT DOCUMENTS

| | | | |
|---|---|---|---|
| 2014/0082410 A1* | 3/2014 | Ziakas .................... | G06F 12/08 |
| | | | 711/105 |
| 2014/0250324 A1* | 9/2014 | Shih ..................... | G06F 1/1632 |
| | | | 714/15 |
| 2015/0248341 A1* | 9/2015 | Cabrera ............. | G06F 11/3006 |
| | | | 714/37 |
| 2015/0363252 A1* | 12/2015 | Singh ................. | G06F 11/0766 |
| | | | 714/57 |
| 2017/0235622 A1* | 8/2017 | Boyapalle .......... | G06F 11/3065 |
| | | | 714/47.2 |
| 2018/0121277 A1* | 5/2018 | Dougherty ......... | G06F 11/0793 |
| 2019/0171575 A1* | 6/2019 | Chen .................. | G06F 12/0897 |

* cited by examiner

Figure 1:
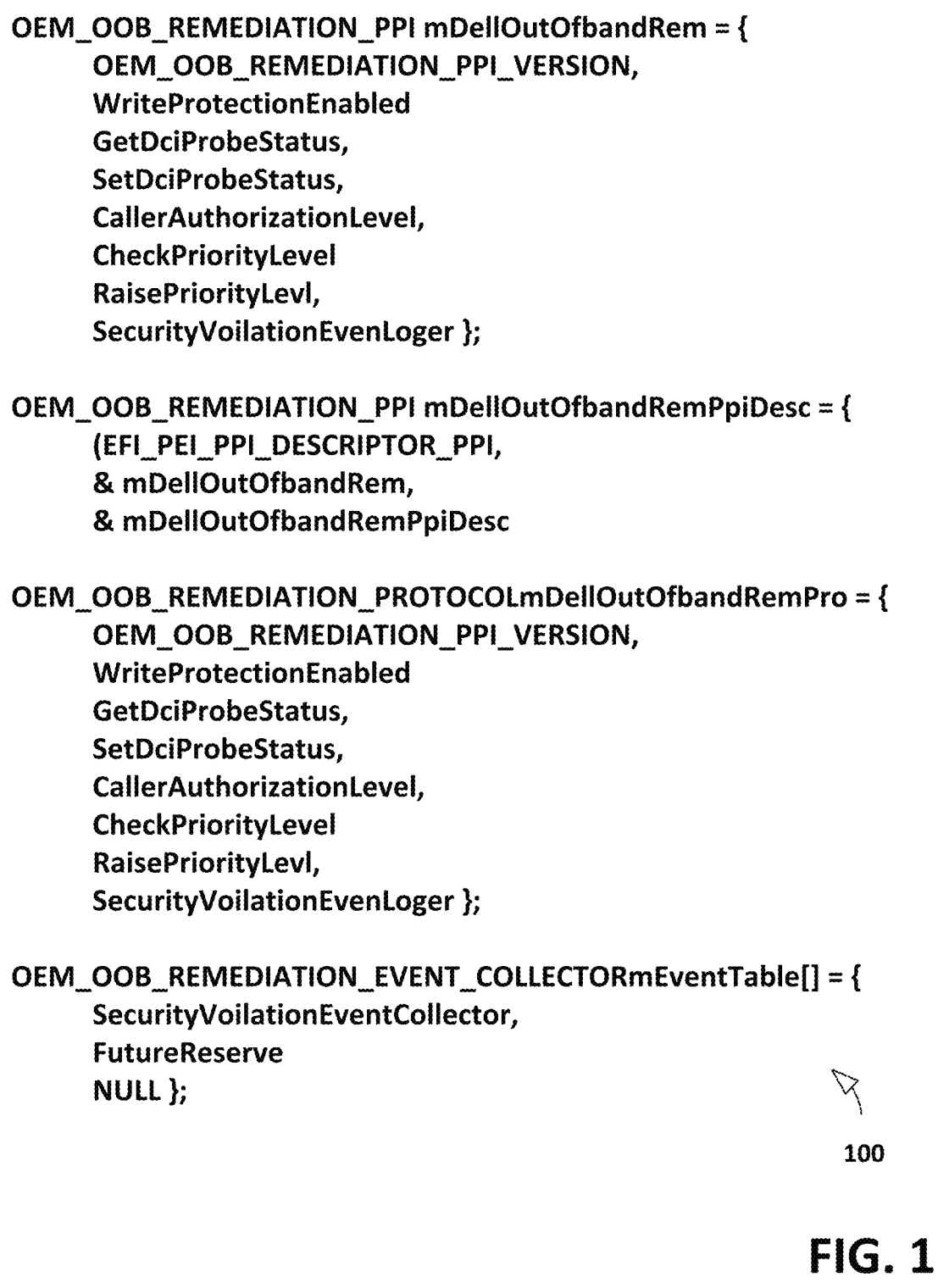

```
OEM_OOB_REMEDIATION_PPI mDellOutOfbandRem = {
      OEM_OOB_REMEDIATION_PPI_VERSION,
      WriteProtectionEnabled
      GetDciProbeStatus,
      SetDciProbeStatus,
      CallerAuthorizationLevel,
      CheckPriorityLevel
      RaisePriorityLevl,
      SecurityVoilationEvenLoger };

OEM_OOB_REMEDIATION_PPI mDellOutOfbandRemPpiDesc = {
      (EFI_PEI_PPI_DESCRIPTOR_PPI,
      & mDellOutOfbandRem,
      & mDellOutOfbandRemPpiDesc OEM_OOB_REMEDIATION_PROTOCOLmDellOutOfbandRemPro = {
      OEM_OOB_REMEDIATION_PPI_VERSION,
      WriteProtectionEnabled
      GetDciProbeStatus,
      SetDciProbeStatus,
      CallerAuthorizationLevel,
      CheckPriorityLevel
      RaisePriorityLevl,
      SecurityVoilationEvenLoger };

OEM_OOB_REMEDIATION_EVENT_COLLECTORmEventTable[] = {
      SecurityVoilationEventCollector,
      FutureReserve
      NULL };
```

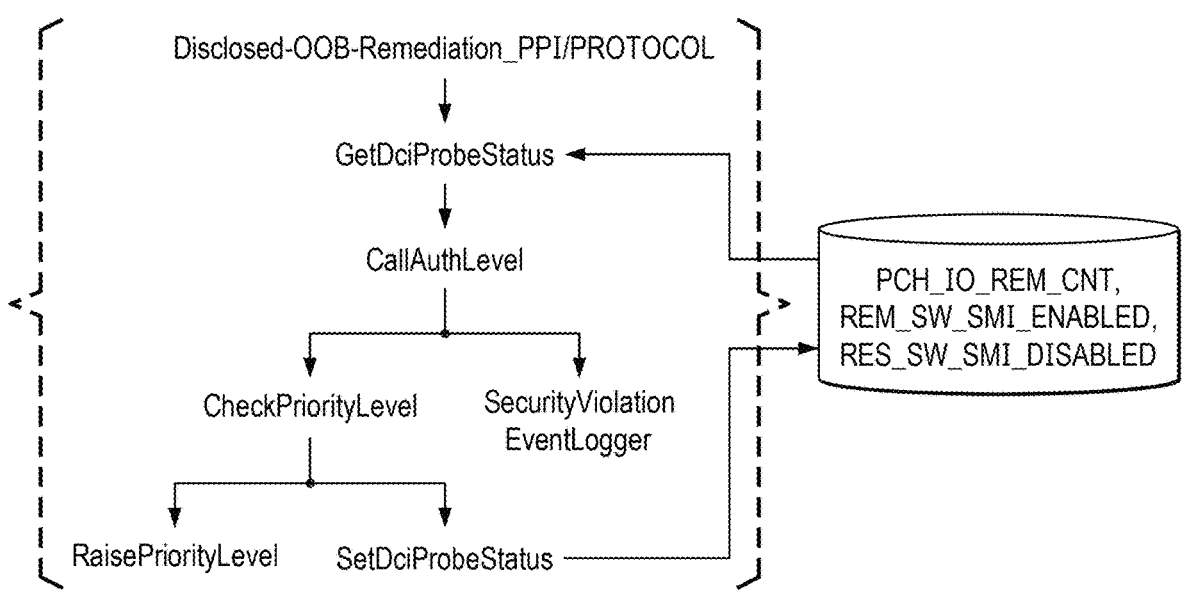

WriteProtectionEnabled:
– PCI SEGMENT READ 32 AND SET THE RESPECTIVE BITS TO ENABLE THE WRITE PROTECTION

GetDciProbeStatus :
– READ THE PCH_IO_REM_CNT FROM PCI CONFIG BASE ADDRESS SPACE - PciSegmentRead32 (PCI CONFIG BASE ADDRESS PCH_IO_REM_CNT);

CallerAuthorizationLevel:
– GET THE DEVICE PATH OF CALLING DRIVER
– GET THE DEVICE PATH NODE AND VALIDATE WITH EUF DEVICE PATH NODE TYPE
– IF THE DEVICE PATH IS USB, APPLICATION TYPE ETC. IF THE NODE TYPE IS BEYOND BIOS DRIVERS OR DELL FACTORY TRUSTED TOOLS, RETURNS THE FAILED AUTHENTICATION STATUS.

CheckPriorityLevel:
– GET THE CURRENT DRIVER EXECUTION PRIORITY LEVEL

RaisePriorityLevel:
– RAISE THE DRIVER EXECUTION PRIORITY LEVELS.

SecurityViolationEventLogger:
– WHEN THE COMPONENT IS RETURNED AS UNAUTHORIZED DRIVER, LOG THE EVENT WITH DRIVER DETAILS USING EFI COMPONENT
NAME PROTOCOL, DEVICE PATH AND NODE TYPE, CALL STACK.

SetDciProbeStatus:
– GET THE PLATFORM CONFIGURATION FOR REMEDIATION MODULE BASE ADDRESS AND SOFTWARE SMI ADDRESS AND VALUE TO SET THE PCH REGISTER.
– USE THE IoWrite TO PCI SEGMENT BASE ADDRESS + REM CONTROL REGISTER WITH SW SMI ENABLED VALUE. CALLED DCI, HDT ETC..
– IoWrite8(PCH_IO_REM_CNT, REM_SW_SMI_ENABLED );

```
SelfhealAssembler.text
_start

_start:            ;SelfhealAssembler entry point
  ;Create the assembler callback registers and database to move the
instruction     pointer to previous check point
                   mov ebx, esi       ; mov current instruction pointer
                   mov ebx, eax       ; load instruction address to eax ; Get the instruction address for previous module
  ; Validate the register values for right address computation _UpdateDriverDetails:
  ; Update the status code registers with POST check pointer
  ; create variable for registers to store the check point
  ; Var1 0xAA
  ; Var2 0xBB mov var1, 0xAA ; example value for PEI stage completion
  mov var1, 0xBB ; example value for DXE stage completion UpdateSPIFFSinfo:
  ; Update the driver load address to variable
  ; Update the driver entry point to variable ; Define the variable and registers for data section
.data
```

REMEDIATION INTERFACE FOR SELF HEAL FIELD FAULTS

TECHNICAL FIELD

The present disclosure relates to information handling systems and, more specifically, features and functions for remediation of such systems.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Manufacturers of microprocessors and other components may develop and support proprietary remediation modules. Intel, as an example, supports Direct Connect Interface (DCI), Asset Debug Module, etc. AMD, as another example, supports Hardware Debug Tool (HDT) and UEFI USB debug module. In each case, the remediation module requires a special boot mode, called debug boot mode, and external adapters, without which the applicable probe will not function. In addition, these tools do not support self-healing, i.e., remediation without manual intervention, on a customer box where debug boot is completely deactivated.

SUMMARY

There is currently no method available to dynamically configure a customer platform to boot into remediation mode and perform self-healing of field faults to enable uninterrupted boot. In some cases, a platform may hang due to asserts, page faults, stack overflows, etc., caused by a corrupted SPI flash corruption or a corrupted nonvolatile firmware file system.

Today's remediation for system faults like blue-screen-of-death (BSOD) is done through a firmware update with fixes to the problems discovered. There is no method present to enable a remediation interface on customer platforms to dynamically collect fault data and learn the faulty behavior. There is no feature enabling dynamic selection of remediation templates to a reported faulty object, which when applied in remediation boot mode, can recover the field faults and boot flow can be continued. Also lacking are features for turning a customer platform from regular boot mode to remediation boot mode with security safe container to load and boot customer image in remediation mode.

A disclosed remediation interface (DRI) implements an event-based module to intelligently scan faulty boot paths and securely prepare appropriate remediation probes. Disclosed subject matter includes an AI, cloud-based remediation engine to learn system faults and corresponding resolutions from various customers and to build fault objects and derive corresponding remediation objects to perform seamless self-healing. The DRI module, after receiving a remediation object, intelligently boots the platform into remediation mode and applies a solution over available probes to resolve the field faults and enable uninterrupted boot. Disclosed methods may implement EC trusted "cryptographic measurement session" where DRI execution is performed with Secure Cloud Remediation Eco System.

A disclosed DRI provides a highly reliable service to intelligently turn a customer platform with Remediation Probes and enable the platform to accept and apply selfheal remediations. Dynamic AI based learning efficiently trains a cloud remediation eco system to derive a remediation object for every field fault object. The remediation object can further remediate (self heal) the faulty platform and enable uninterrupted boot. In some embodiments, DRI execution is cryptographically measured over a secure channel to ensure safe and secure remediation at a customer site. Trusted transition layer and Secured OEM based commands for silicon-specific hardware component technology or hardware connection interfaces stack initialization with dynamic peripheral platform controller hub (PCH) configuration to enable platform components.

A disclosed trusted transmission protocol makes platform components accessible to hardware interface remediation modules. This solution implements interface for secured communication protocol to enable platform components for HDT/DCI probe. This method installs PPI interface method for PEI drivers to access the communication layer and protocol interface for DXE and runtime modules. PPI and protocol provides layer and interface methods for getting out of band module status, authorization levels and interface to enable or disable DCI probe, write protection enable method for untrusted components, event collector for handling security violations etc.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein:

FIG. 1 illustrates example coding for elements of a trusted transition protocol in accordance with disclosed subject matter;

FIG. 2 and FIG. 3 illustrate exemplary secure OEM commands for silicon specific hardware direct connect stack initialization;

FIG. 5 illustrates elements of an AI-based cloud eco system manageability module for OEM remediation interface for self-healing;

FIG. 6 and FIG. 7 illustrate an example self-healing remediation assembler suitable to create a page at runtime or load assembler for page creation and solution selection in next boot when any assert, page fault, or stack overflow occurs due to SPI corruption or nonvolatile firmware file system corrupted;

DETAILED DESCRIPTION

Figure 3:
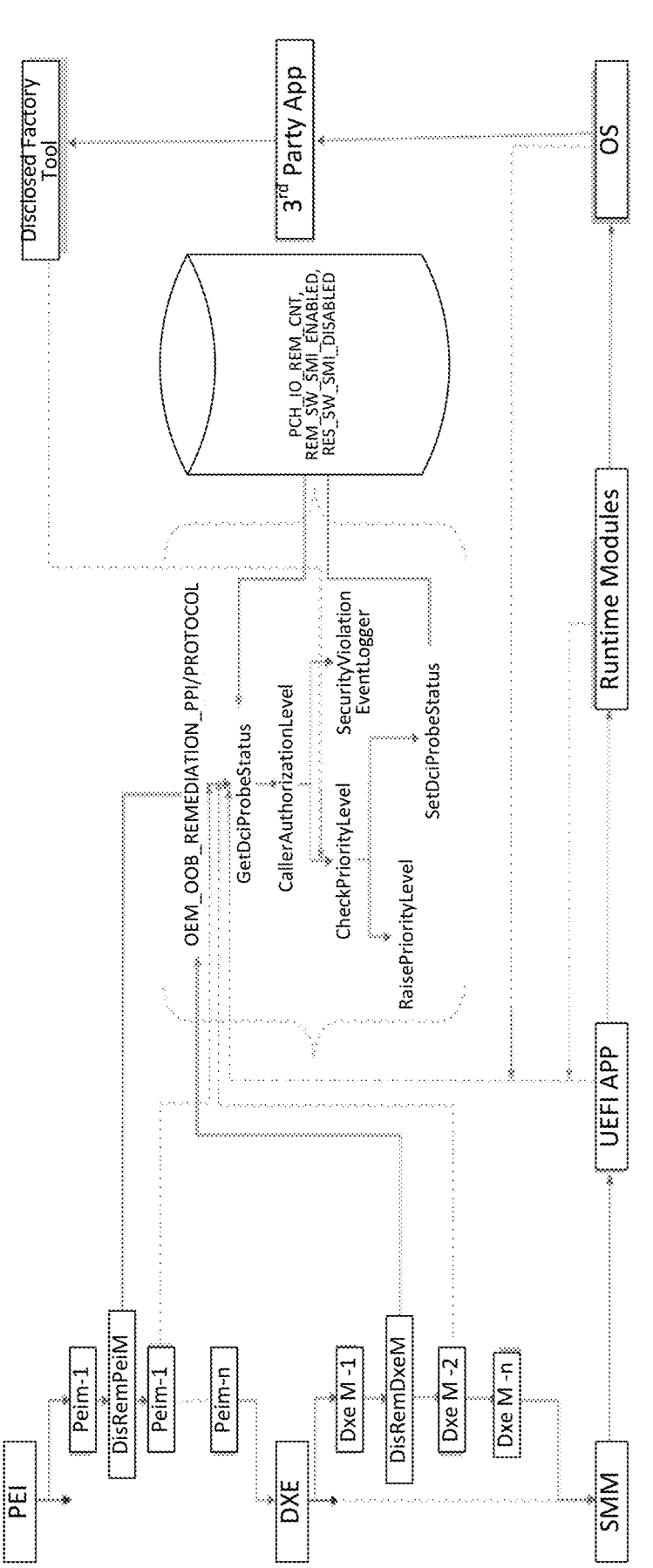

Exemplary embodiments and their advantages are best understood by reference to FIGS. 1-11, wherein like numbers are used to indicate like and corresponding parts unless expressly indicated otherwise.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU"), microcontroller, or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

Additionally, an information handling system may include firmware for controlling and/or communicating with, for example, hard drives, network circuitry, memory devices, I/O devices, and other peripheral devices. For example, the hypervisor and/or other components may comprise firmware. As used in this disclosure, firmware includes software embedded in an information handling system component used to perform predefined tasks. Firmware is commonly stored in non-volatile memory, or memory that does not lose stored data upon the loss of power. In certain embodiments, firmware associated with an information handling system component is stored in non-volatile memory that is accessible to one or more information handling system components. In the same or alternative embodiments, firmware associated with an information handling system component is stored in non-volatile memory that is dedicated to and comprises part of that component.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, and/or any other components and/or elements of an information handling system.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically. Thus, for example, "device 12-1" refers to an instance of a device class, which may be referred to collectively as "devices 12" and any one of which may be referred to generically as "a device 12".

As used herein, when two or more elements are referred to as "coupled" to one another, such term indicates that such two or more elements are in electronic communication, mechanical communication, including thermal and fluidic communication, thermal, communication or mechanical communication, as applicable, whether connected indirectly or directly, with or without intervening elements.

Figure 10:
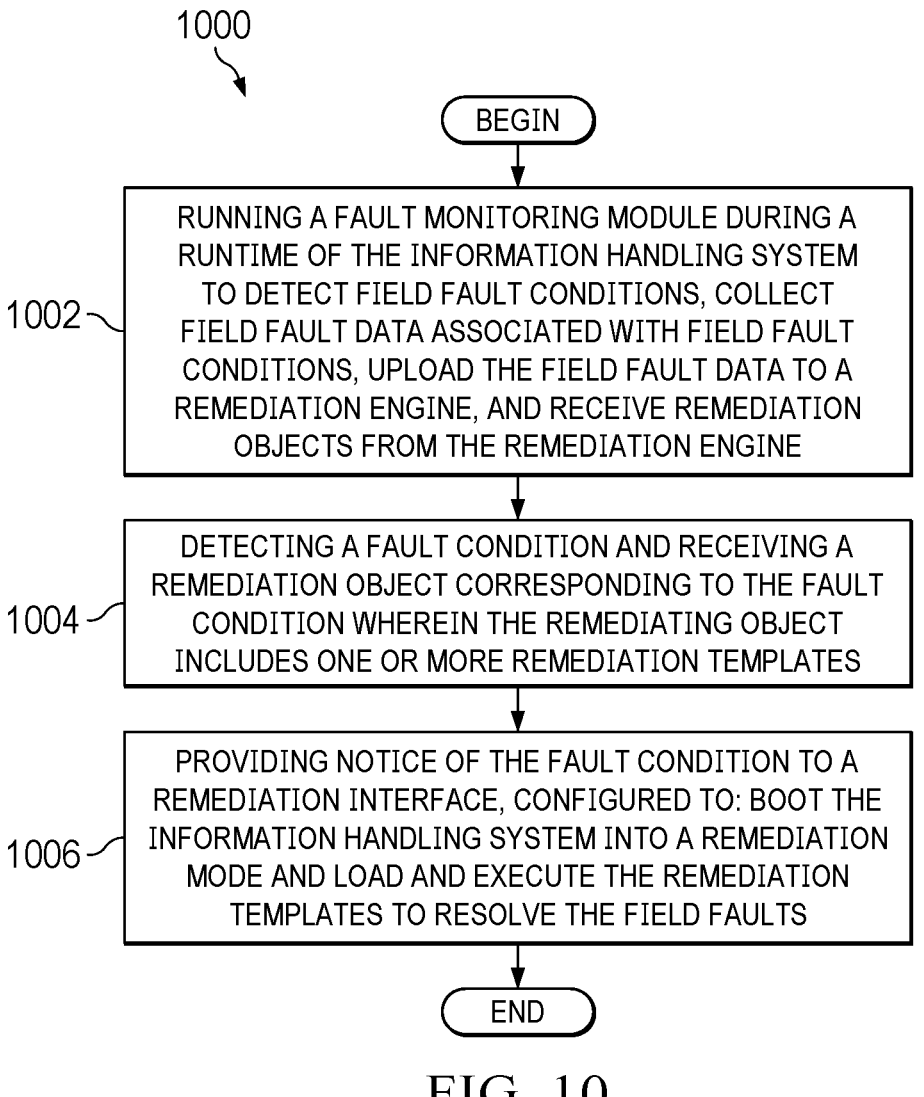
FIG. 10 illustrates a flow diagram of a self-healing method in accordance with disclosed subject matter.
Figure 11:
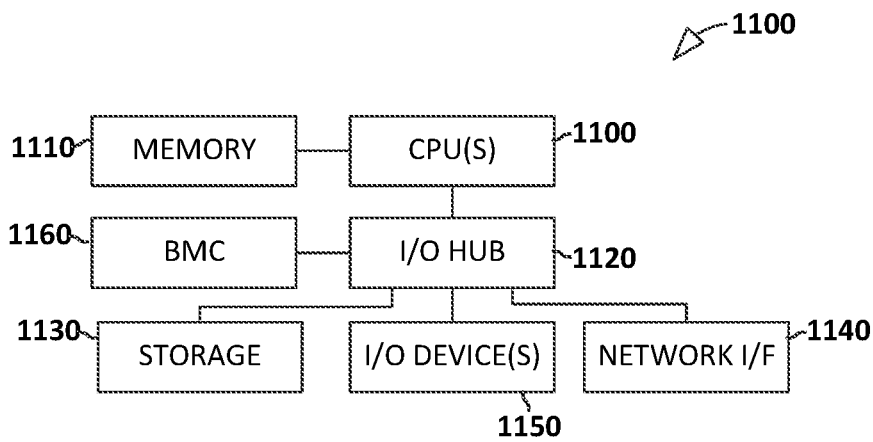
FIG. 11 illustrates an exemplary information handling system suitable for use in conjunction with subject matter illustrated in FIG. 1 through FIG. 10 and described in the accompanying text.

Turning first to FIG. 10, a flow diagram illustrates an exemplary method 1000 for implementing information handling system remediation features. The illustrated method 1000 begins by running (operation 1002) a fault monitoring module during a runtime of an information handling system. The fault monitoring module may perform functions including detecting field fault conditions, collecting field fault data associated with field fault conditions, uploading field fault data to a cloud-resident AI-based remediation engine, and receiving remediation objects from the remediation engine. In accordance with the illustrated method 1000, the fault monitoring module may detect (operation 1004) a fault condition and receive a remediation object corresponding to the fault condition. The remediation object may include one or more remediation templates for executing direct connect stack initializations and dynamically configuring the systems PCH. The method 1000 illustrated in FIG. 10 further includes providing notice (operation 1006) of the fault condition to a remediation interface is, in at least some implementations, configured to boot the information handling system into a remediation mode and load and execute the remediation templates to resolve the field faults.

Referring now to FIG. 1, disclosed remediation solutions may implement out of band remediation PEI/DXE/SMM modules 100 to enable protection and services in different UEFI phases.

A remediation DXE/SMM driver may install OEM_OOB REMEDIATION_PROTOCOL interface with above services for DXE modules and runtime drivers to use and probe DCI components. This driver also implements an Event Log mechanism for security violation in components enablement by unauthorized modules.

Secure OEM based commands (201) for silicon-specific hardware direct connect Stack initialization with dynamic PCH configuration. Referring now to FIG. 2 and FIG. 3, illustrated features define OEM platform PCH registers and base address for remediation components. This registers address will be customized by platform team.

Figure 4:
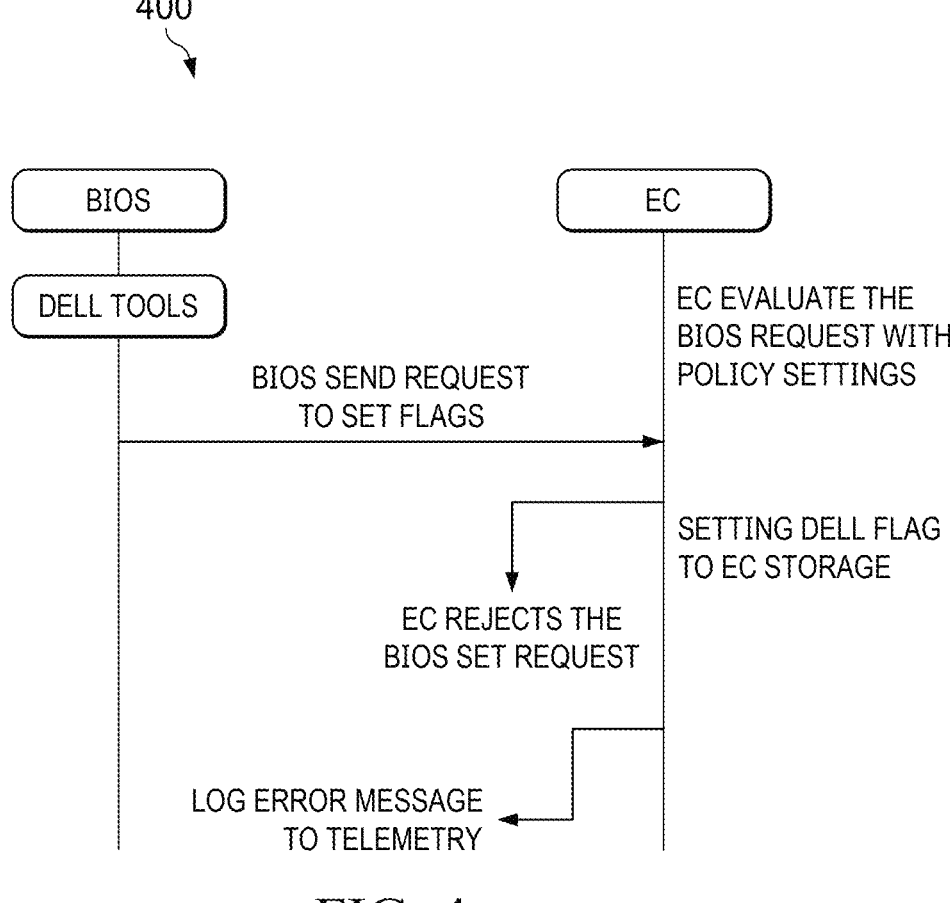
FIG. 4 illustrates features of a runtime periodic event handler to retrieve a platform boot mode and state and poll the EFI events.

AI based Cloud Eco System Manageability module (400) for OEM remediation interface for self-healing: Referring now to FIG. 4, This solution implements a runtime periodic Event handler to retrieve the platform boot mode and state and poll the EFI events. And algorithm to determine the motherboard state and probe out of band remediation modules.

Runtime Callback method implements algorithm to detect the state of motherboard and handle remediation module.

In early PEI boot phase this solution implements a method to create periodic timer-based event and register for dynamic callback method which determine and handle remediation flow. The callback algorithm has different methods and flow analysis to poll the event in different stage of pre boot states and create a memory hob which can pass to later stage of bios boot.

AI based Cloud Eco System Manageability module for Dell remediation interface for self-healing. This algorithm also implements solution also define different dell customized states which can be mapped to an equivalent post code. Remediation module will use this customized states to change the boot mode and call the interfaces to enable the dci probe.

If there is no platform boot issues or unsatisfied authorization levels control will transfer to DXE phase. This method also implement DXE/SMM driver to locate the memory hob created in early phase and create runtime methods to determine motherboard states and tune the self-healing mechanism.

Figure 5:
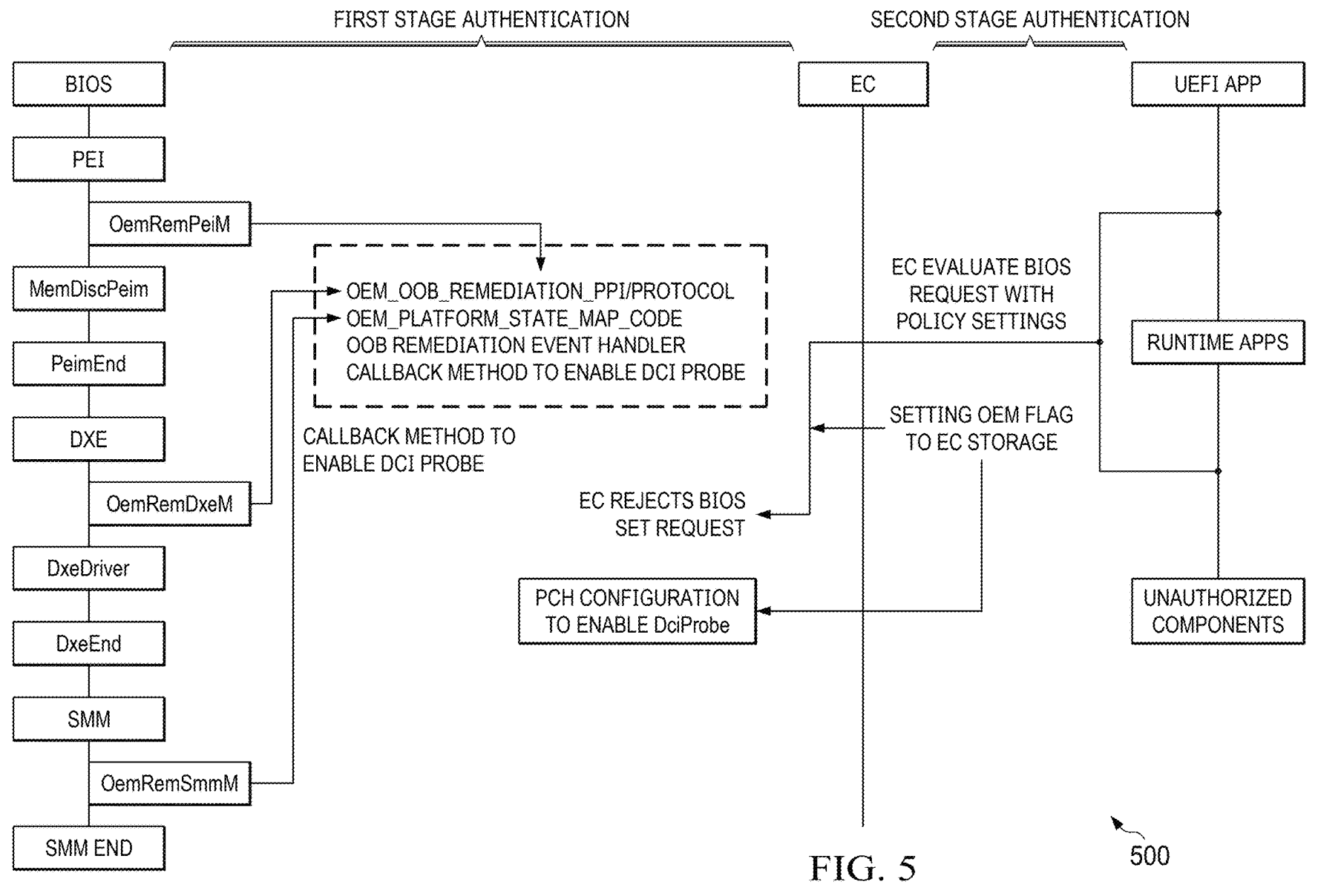

Referring now to FIG. 5, disclosed features 500 create a multiple events methods with Timer based to pool and detect the platform state, Runtime based event to notify the runtime module to update the state, notify signal event to trigger notify function. Implement the callback function for different notify event mechanism with defined timer set. The callback function reads the boot mode platform, current state of the platform by reading the call stack post modules, creates the device path and update the state to the remediation module. When the callback function determines the state is malfunctioned or system hangs in post, then the callback method implements the solution to probe the DCI modules and share the flaw analysis details and loads the back up or updated modules.

Figure 6:
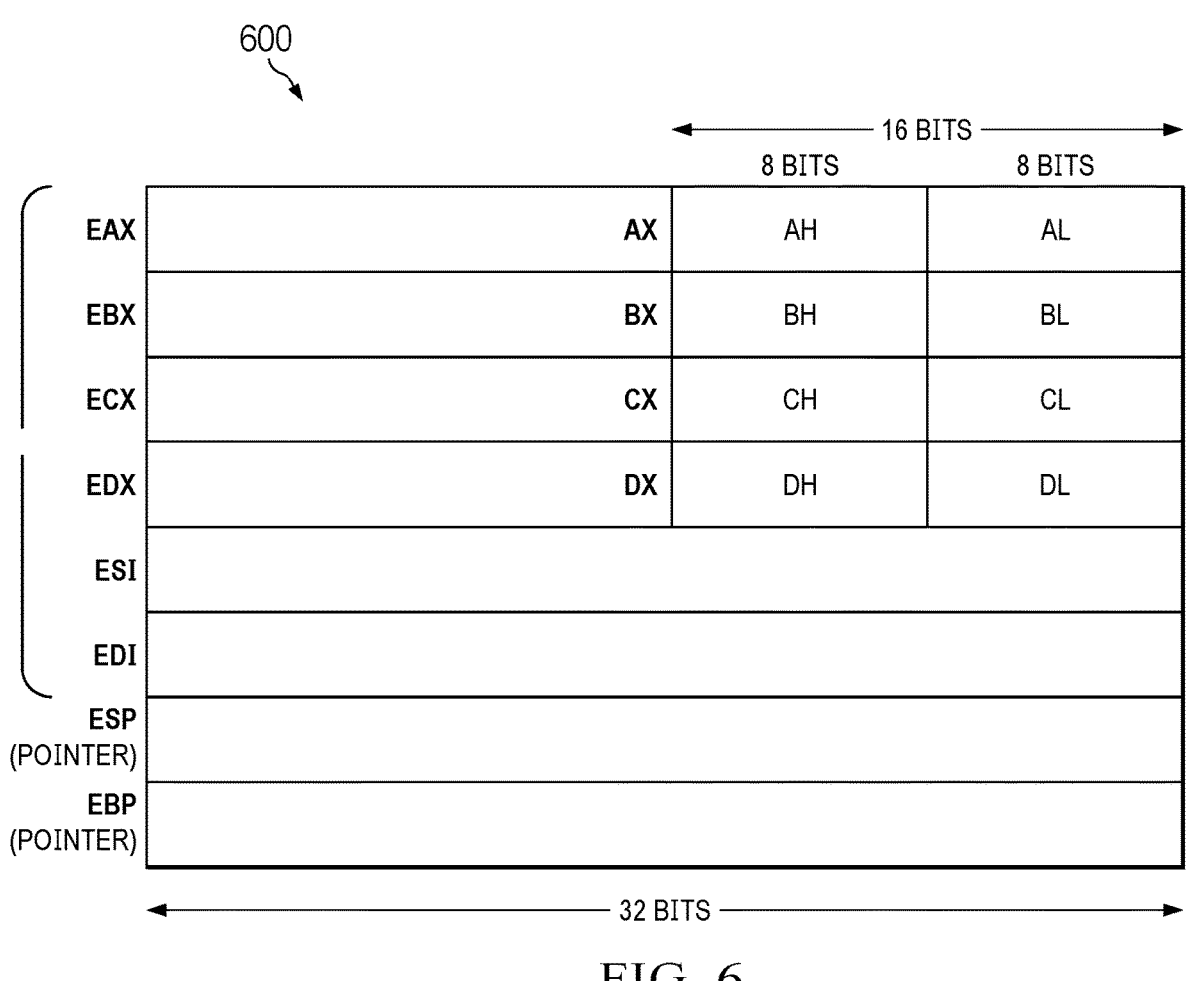
Figure 8:
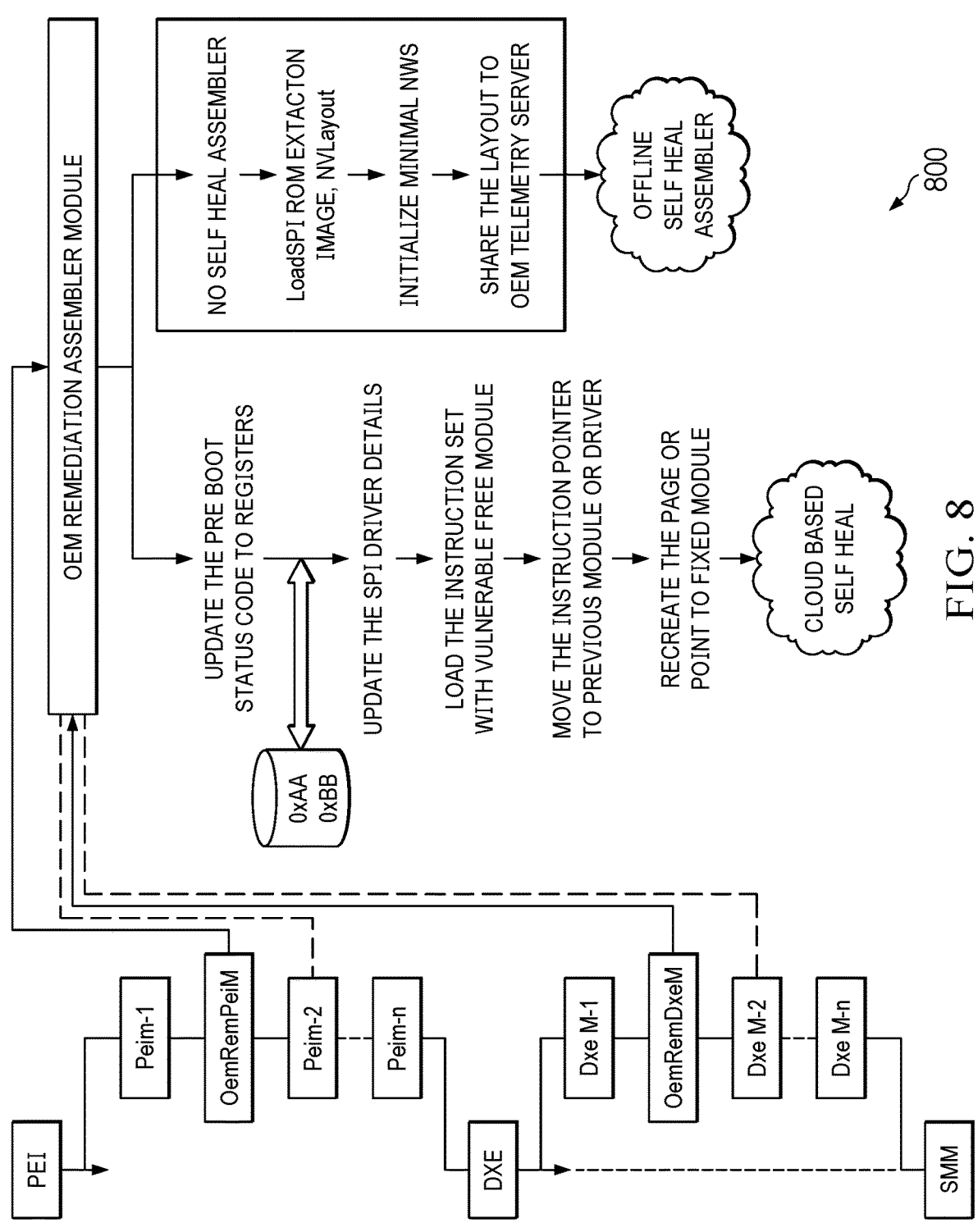
FIG. 8 illustrates a Disclosed Remediation Interface (DRI) self-healing remediation module to enable secure remediation probes.

Disclosed Remediation Interface (DRI) Self-Healing Remediation Module to Enable Secure Remediation Probes:

Referring now FIG. 6 and FIG. 7, disclosed features 600 and 700 provide a self-healing remediation assembler with dynamic method to create a page at runtime or load assembler for page creation and make the solution is picked in next boot when any assert, page fault or stack overflow occurred due to SPI corruption or nonvolatile firmware file system corrupted. The proposed solution monitor the security vulnerabilities and strength of customer settings and passwords and provides dynamic assembler for method to load the vulnerable free driver at runtime using Self-healing assembler. Also provides a method when there is no self-healing method available in cloud, Dell team can reproduce the issue and extract the ROM image and upload the image to dell cloud using offline self-healing assembler.

This solution provides a dynamic callback method OEM remediation assembler module) to get the instruction pointer in frequent and timer based PEI, DXE, SMM and runtime modules. The callback mechanism will assemble the required instruction pointers and registers to move the control instruction to previously dispatched driver or modules. Get the component and device path of the previously dispatched driver and adds an entry to callback remediation assembler module. Callback method will get the driver loading address and entry point address.

Use the dedicated registers to update the post status code which consumed and updated by self-healing assembler.

Once the assembler method adds instruction set, component, device loading address and entry points, it updates the post check point status to registers.

Figure 9:
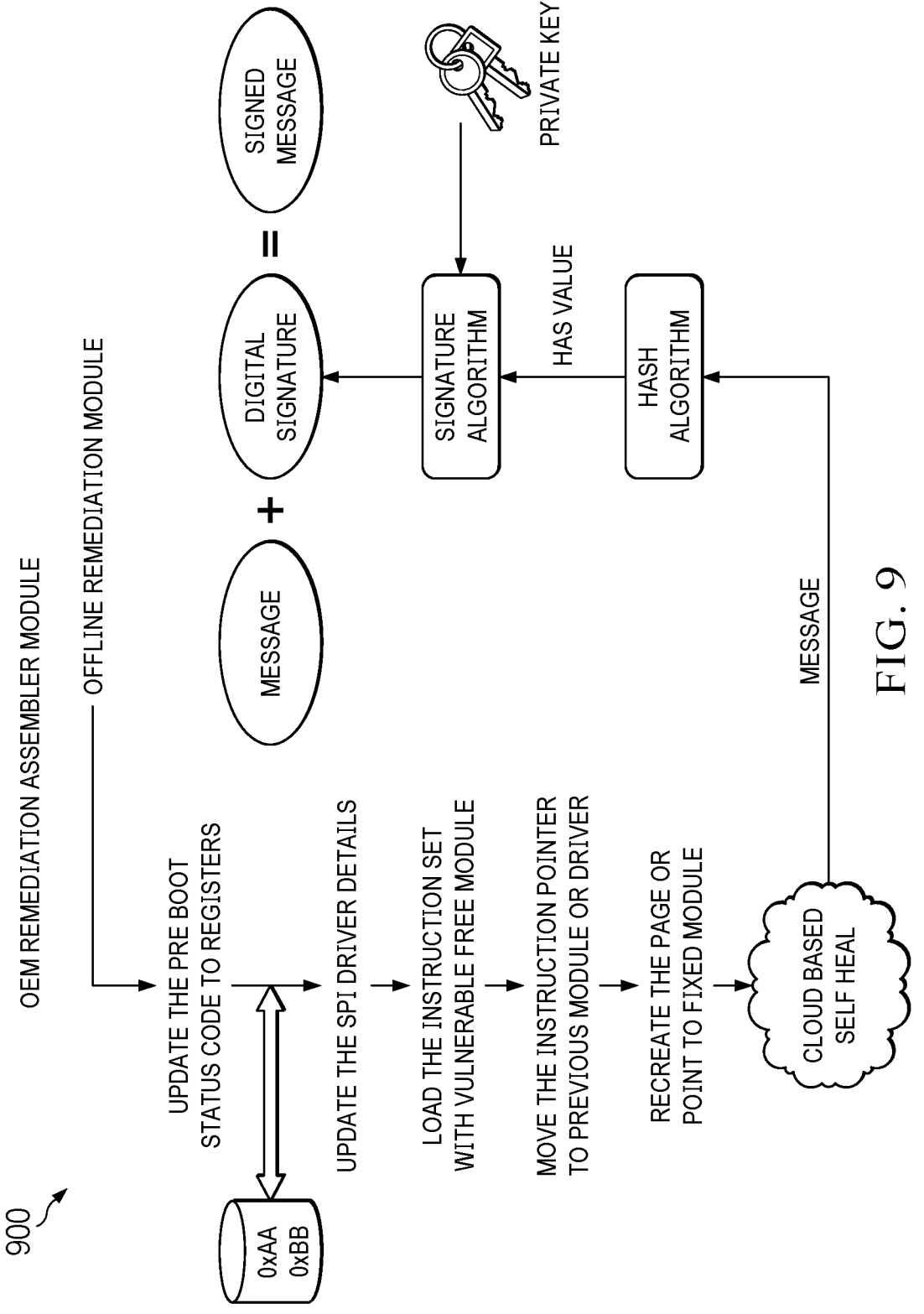
FIG. 9 illustrates a security handshake between platform firmware boot and cloud based self-healing assembler module for DIR boot.

Security Handshake Between Platform Firmware Boot and Cloud Based Self-Healing Assembler Module for DIR Boot Referring now to FIG. 9, This Solution 900 uses Secure boot Authenticated Variable services and interfaces to validate the cloud based and offline based self-healing assembler module. This will provide the secure and trusted handshake between platform firmware modules and extended remote firmware modules.

This module use authenticated variable with Authenticated write access bit set when set variable is called. Authentication of calling module will be validated before writing into storage.

When platform boots with DIR mode and clones the remediation module from cloud, It verifies whether remediation module is executable and allowed load and execute during DIR boot path.

DIR boot path will check whether the cloud-based remediation module is discovered, pre boot checks the below things a. The Cloud based remediation module is signed with an authorized key or not.

b. DIR module key/signature/hash of the executable is stored into the authorized signature database and validated before they executed Referring now to FIG. 11, any one or more of the elements illustrated in FIG. 1 through FIG. 10 may be implemented as or within an information handling system exemplified by the information handling system 1100 illustrated in FIG. 11. The illustrated information handling system includes one or more general purpose processors or central processing units (CPUs) 1101 communicatively coupled to a memory resource 1110 and to an input/output hub 1120 to which various I/O resources and/or components are communicatively coupled. The I/O resources explicitly depicted in FIG. 11 include a network interface 1140, commonly referred to as a NIC (network interface card), storage resources 1130, and additional I/O devices, components, or resources 1150 including as non-limiting examples, keyboards, mice, displays, printers, speakers, microphones, etc. The illustrated information handling system 1100 includes a baseboard management controller (BMC) 1160 providing, among other features and services, an out-of-band management resource which may be coupled to a management server (not depicted). In at least some embodiments, BMC 1160 may manage information handling system 1100 even when information handling system 1100 is powered off or powered to a standby state. BMC 1160 may include a processor, memory, an out-of-band network interface separate from and physically isolated from an in-band network interface of information handling system 1100, and/or other embedded information handling resources. In certain embodiments, BMC 1160 may include or may be an integral part of a remote access controller (e.g., a Dell Remote Access Controller or Integrated Dell Remote Access Controller) or a chassis management controller.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. A method for remediating an information handling system, wherein the method comprises: during a runtime of the information handling system, periodically running a fault monitoring module to detect field fault conditions, collect field fault data associated with field fault conditions, upload the field fault data to a remediation engine, and receive remediation objects from the remediation engine; detecting a fault condition; receiving a remediation object corresponding to the fault condition wherein the remediation object includes one or more remediation templates; and providing notice of the fault condition to a remediation interface, wherein the remediation interface is configured to: boot the information handling system from the runtime, into a remediation boot mode; load and execute the remediation templates to execute direct connect stack initializations, dynamically configure a platform controller hub (PCH), and resolve the fault condition.

2. The method of claim 1, wherein the fault condition is indicative of any one or more of:

a central processing unit (CPU) exception, a page fault, a system hang, a blue screen of death (BSOD), a system not responding condition attributable to poor performance of a module, and a vulnerability detected condition.

3. The method of claim 1, wherein the remediation interface is configured to perform a security handshake with a boot path loader to boot the information handling system into the remediation mode.

4. The method of claim 1, wherein the remediation interface is further configured to set one or more break points based, at least in part, on one or more code offsets from the fault monitoring module.

5. The method of claim 1, wherein the remediation mode implements a trusted transmission protocol to associate hardware interface remediation modules with platform components.

6. An information handling system, comprising:

a central processing unit (CPU); and a non-transitory memory, accessible to the CPU, including processor executable instructions that, when executed by the CPU, cause the system to perform operations comprising:

during a runtime of the information handling system, periodically running a fault monitoring module to detect field fault conditions, collect field fault data associated with field fault conditions, upload the field fault data to a remediation engine, and receive remediation objects from the remediation engine;

detecting a fault condition;

receiving a remediation object corresponding to the fault condition wherein the remediation object includes one or more remediation templates; and providing notice of the fault condition to a remediation interface, wherein the remediation interface is configured to:

boot the information handling system from the runtime, into a remediation boot mode; and load and execute the remediation templates to execute direct connect stack initializations, dynamically configure a platform controller hub (PCH), and resolve the fault condition.

7. The information handling system of claim 6, wherein the fault condition is indicative of any one or more of:

a central processing unit (CPU) exception, a page fault, a system hang, a blue screen of death (BSOD), a system not responding condition attributable to poor performance of a module, and a vulnerability detected condition.

8. The information handling system of claim 6, wherein the remediation interface is configured to perform a security handshake with a boot path loader to boot the information handling system into the remediation mode.

9. The information handling system of claim 6, wherein the remediation interface is further configured to set one or more break points based, at least in part, on one or more code offsets from the fault monitoring module.

10. The information handling system of claim 6, wherein the remediation mode implements a trusted transmission protocol to associate hardware interface remediation modules with platform components.

* * * * *